Jan. 13, 1948.  G. F. JOHNSON  2,434,245
GRINDING MACHINE
Filed Feb. 16, 1946  6 Sheets—Sheet 1

Inventor
Glen F. Johnson
by Barthel & Bugbee
Att'y's

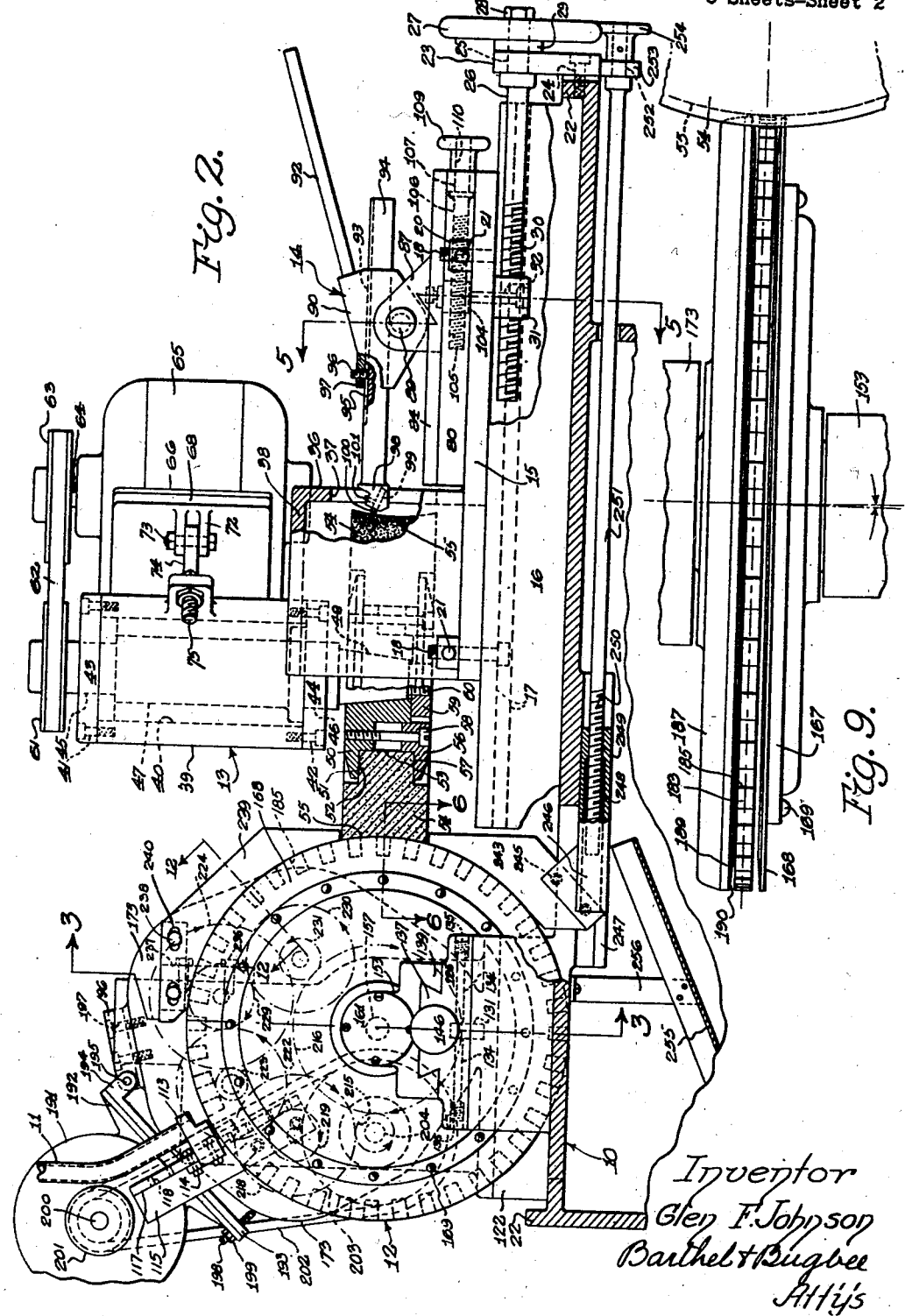

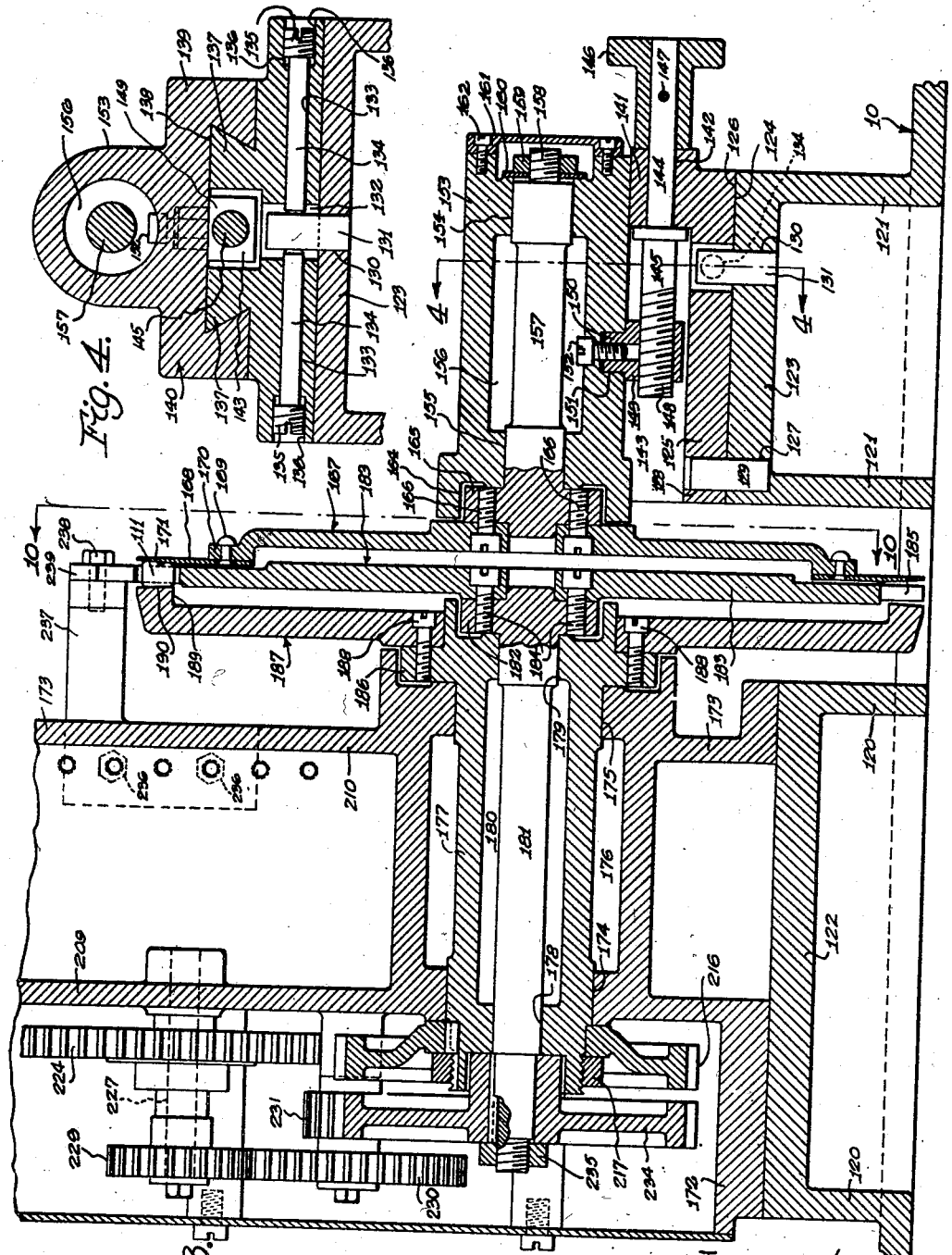

Jan. 13, 1948.    G. F. JOHNSON    2,434,245
GRINDING MACHINE
Filed Feb. 16, 1946    6 Sheets-Sheet 4
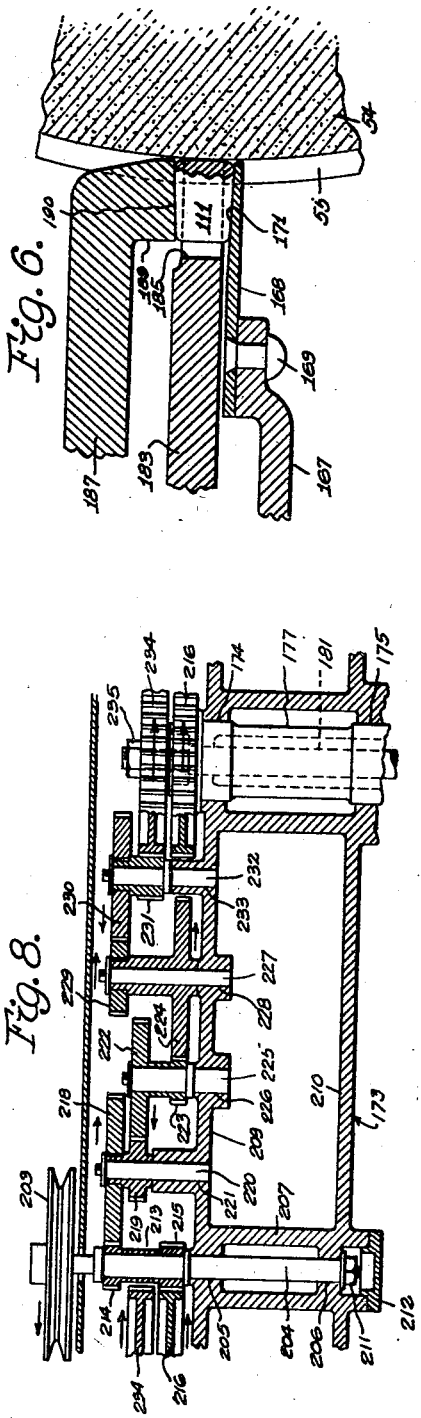
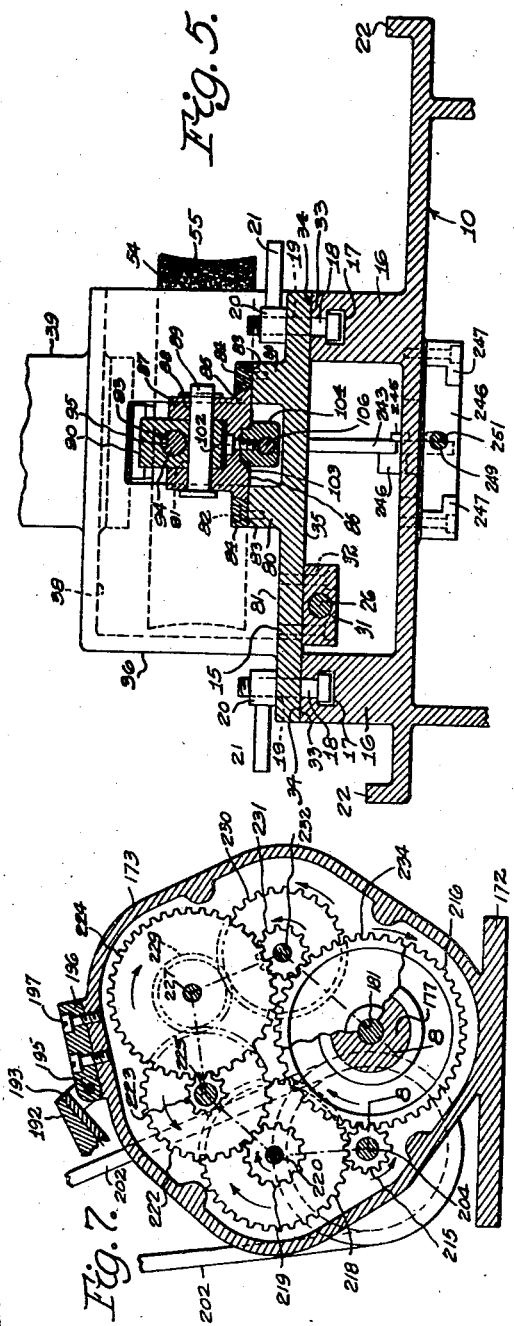
Inventor
Glen F. Johnson
By Barthel & Bugbee
Atty's

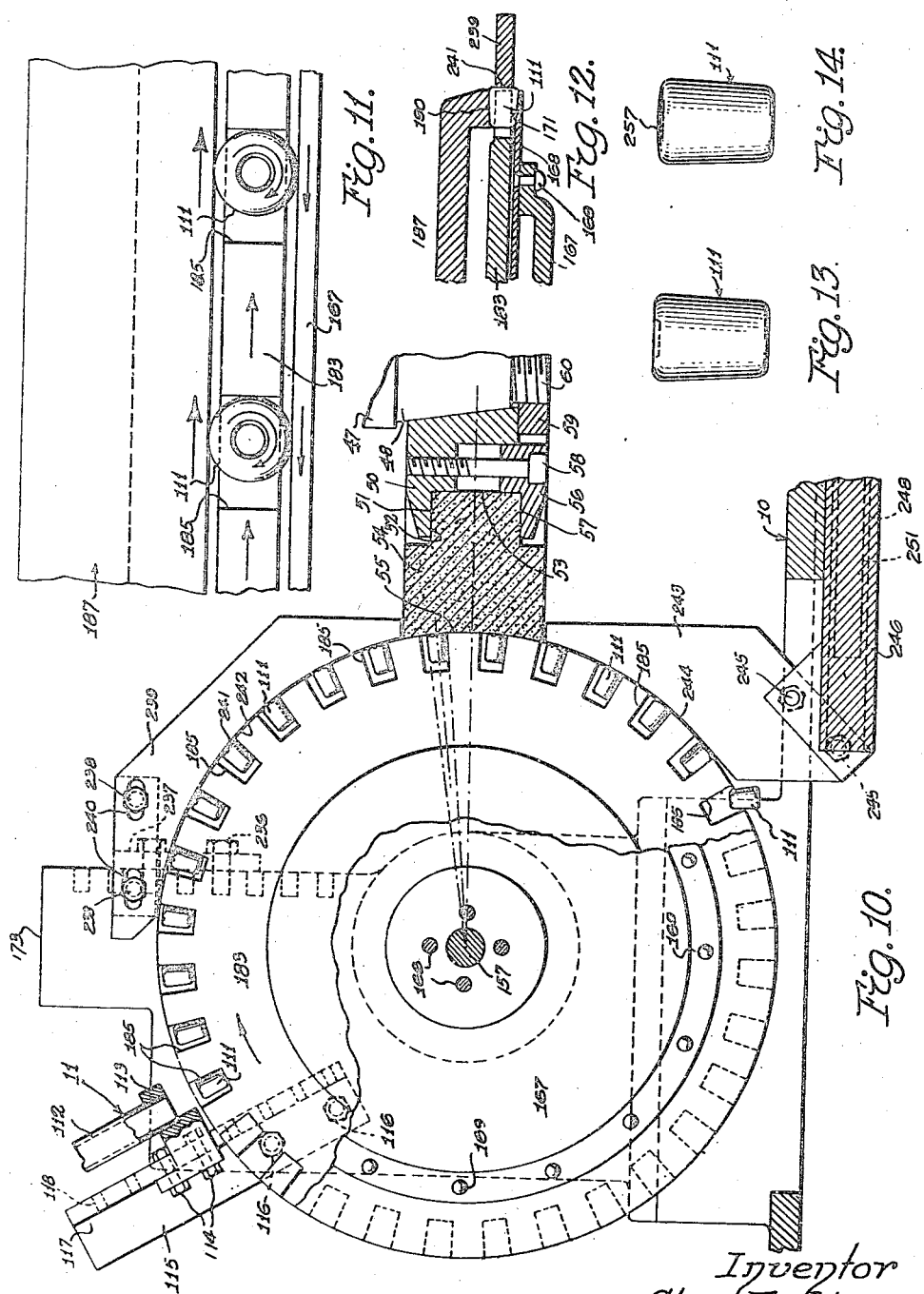

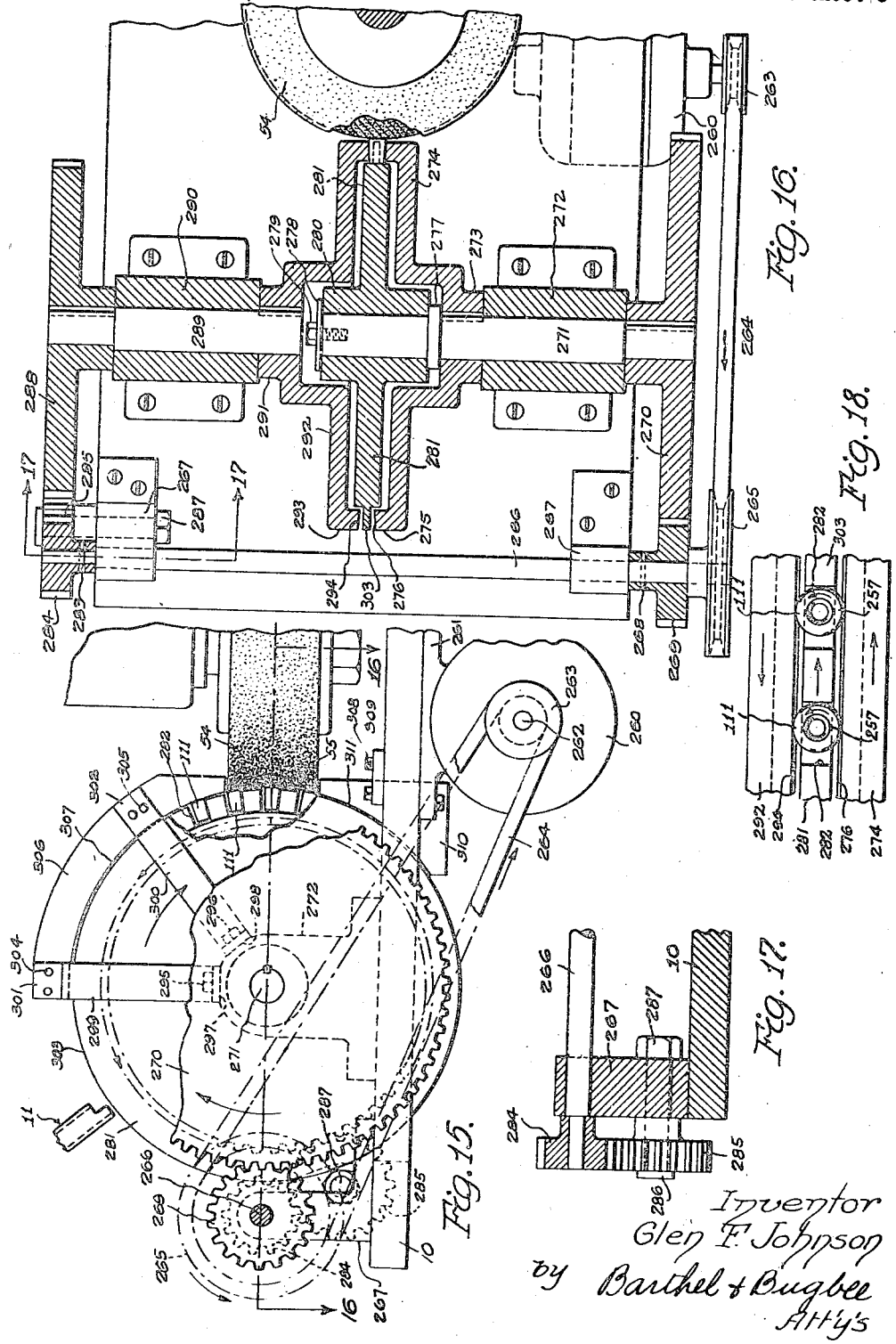

Patented Jan. 13, 1948

2,434,245

UNITED STATES PATENT OFFICE 2,434,245

GRINDING MACHINE

Glen F. Johnson, Detroit, Mich., assignor to Bower Roller Bearing Company, Detroit, Mich., a corporation of Michigan Application February 16, 1946, Serial No. 648,050

15 Claims. (Cl. 51—74)

This invention relates to grinding machines, and in particular, to machines and methods for grinding curved surfaces on the ends of elongated articles.

One object of this invention is to provide an improved machine for grinding curved surfaces upon the ends of elongated articles, such as anti-friction bearing rollers, by automatic mass production methods in an efficient and accurate manner.

Another object is to provide an improved machine for grinding curved surfaces upon the ends of tapered elongated articles, such as tapered anti-friction bearing rollers wherein the rollers are rotated around their axes while being simultaneously rotated in a circular path, a portion of which brings their ends into engagement with a suitably curved grinding wheel.

Another object is to provide a machine for grinding curved surfaces on the ends of tapered elongated articles, as set forth in the preceding objects, wherein the articles are held in a rotating holder while rotated by a more rapidly rotating driving wheel as they travel in a circular path during which they engage the grinding wheel.

Another object is to provide a machine for grinding curved surfaces on the ends of tapered elongated articles, as set forth in the preceding objects, wherein the articles are held in recesses in a rotating circular holder while they are engaged on one side by a yieldable resilient pressure wheel and on the other side by a more rapidly rotating driving wheel, this action causing the articles to be held firmly against the leading edge of the holder recess as the article is brought into engagement with the grinding wheel while at the same time the resilience of the pressure wheel automatically accommodates the machine to grinding the ends of the articles properly, regardless of variations in their diameters arising during manufacture.

Another object is to provide a machine for grinding curved surfaces on the ends of tapered elongated articles, as set forth in the object immediately preceding, wherein the driving wheel has a tapered surface on the side of the rim for engaging the tapered surface of the article and at the same time urging it against a yielding pressure wheel also having a tapered surface, whereby the article is caused to be moved radially outward as it is rotated bodily through a circular path, thereby bringing its end properly into engagement with the grinding wheel.

Another object is to provide a machine for grinding curved surfaces on the ends of tapered elongated articles as set forth in the preceding objects, wherein the articles are held in recesses in a rotating circular holder while they are engaged on one side by a yieldable pressure wheel and on the other side by a more rapidly rotating driving wheel, the axis of the pressure wheel being tilted relatively to the axis of the driving wheel such that the space between them is wider on the side opposite the grinding wheel and narrower on the side adjacent the grinding wheel, the wider space facilitating the insertion of the articles into the holder and the narrower space causing the articles to be gripped more tightly while they are being ground.

Another object is to provide a modified machine as set forth in the preceding objects wherein the driving wheel and pressure wheel are both positively driven at slightly different speeds in opposite directions and the circular article holder is mounted for free rotation between them, the speed difference between the two wheels not only causing the article to be urged toward the forward end of the holder recess but also to cause the holder itself to be rotated toward the grinding wheel.

Other objects and advantages of the invention will become apparent during the course of the following description of the accompanying drawings, wherein:

Figure 2 is a side elevation of the grinding machine shown in Figure 1, also partly broken away to disclose the internal construction more clearly;

Figure 3 is a vertical cross-section through the grinding machine shown in Figures 1 and 2, taken along the line 3—3 in Figure 2 and showing the roller holder, the driving wheel and the pressure wheel with their associated mechanisms;

Figure 4 is a vertical cross-section along the line 4—4 in Figure 3;

Figure 5 is a vertical cross-section along the line 5—5 in Figure 2, showing the grinding wheel truing mechanism;

Figure 6 is an enlarged fragmentary horizontal section along the line 6—6 in Figure 2, showing the roller being driven by the driving wheel while urged against the pressure wheel and held in the holder;

Figure 7 is a vertical cross-section along the line 7—7 in Figure 1, showing the gearing interconnecting the roller holder and driving wheel;

Figure 8 is a developed horizontal section through the gearing shown in Figure 7, showing the gearing in sequence;

Figure 9 is a fragmentary top plan view of the roller holder, driving wheel and pressure wheel, showing the slightly tilted axis of the pressure wheel relatively to the driving wheel and holder;

Figure 10 is a vertical cross-section along the line 10—10 in Figure 3 with the pressure wheel partly broken away to show the positions of the rollers in the roller holder from the time they enter the latter, are rotated through the grinding position and are discharged as finished work pieces;

Figure 11 is an enlarged fragmentary top plan view of portions of the roller holder, driving wheel and pressure wheel, showing the manner in which the rollers are held against the leading edge of the roller recesses in the roller holder;

Figure 12 is an oblique section along the line 12—12 in Figure 2, showing the action of the upper guide plate in relation to the roller holder, driving wheel and pressure wheel;

Figure 13 is a side elevation of a roller prior to grinding a curved surface upon the end thereof;

Figure 14 is a side elevation of a roller after a curved surface is ground upon the end thereof, according to the present invention;

Figure 15 is a side elevation, partly in section, of a modified roller holding and driving unit, wherein the driving wheel and pressure wheel are both positively driven and the roller holder is mounted for free rotation between them;

Figure 16 is a horizontal section along the line 16—16 in Figure 15;

Figure 17 is a fragmentary vertical section along the line 17—17 in Figure 16; and Figure 18 is a view similar to Figure 11, but showing the driving arrangement in the modification of Figure 15.

General arrangement

Figure 1:
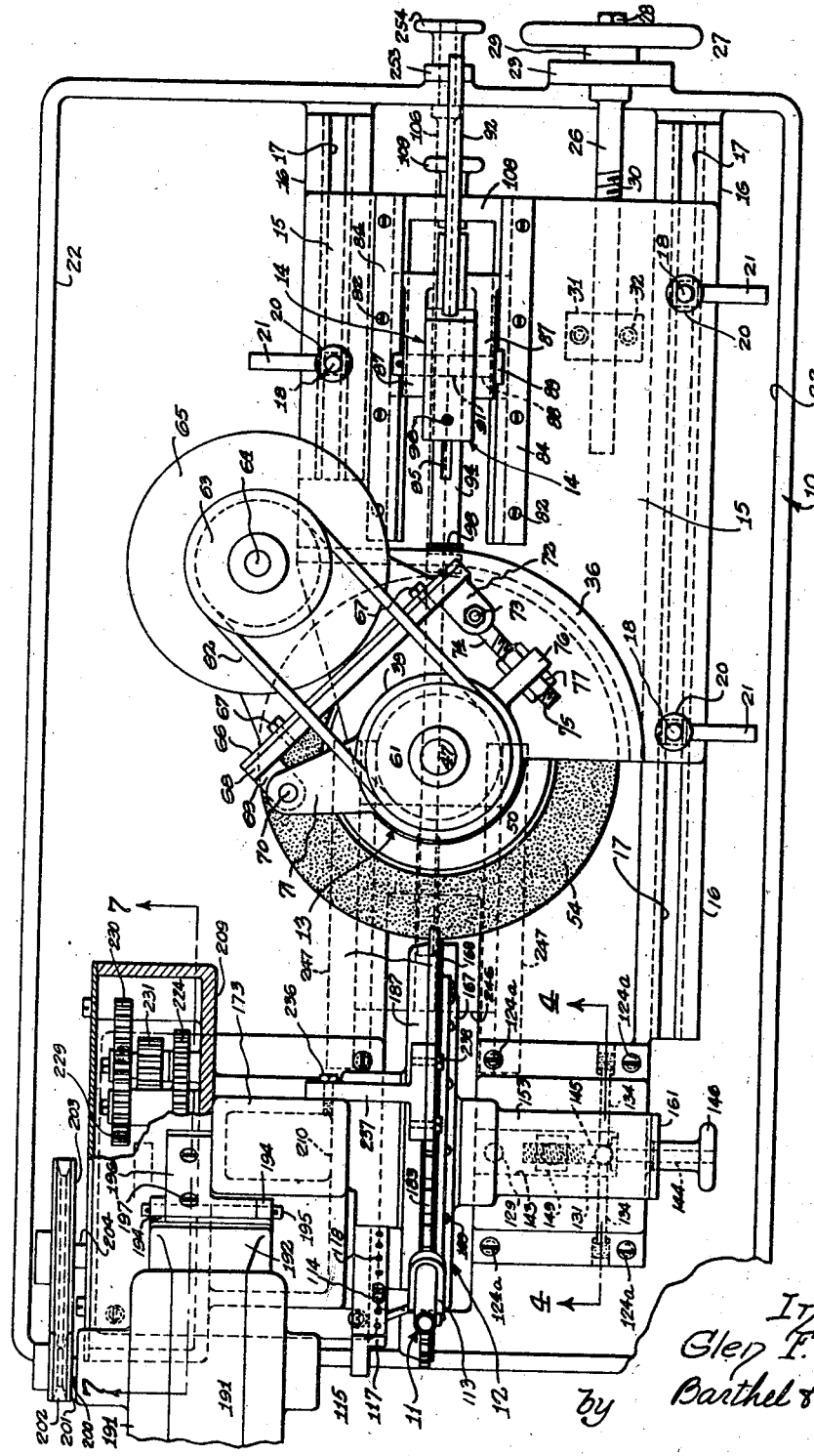
Figure 1 is a top plan view of a preferred embodiment of a grinding machine, according to the present invention, partly broken away to disclose the gearing for the roller driving wheel.

In general, the grinding machine of this invention consists of a rotary roller holder (Figures 3, 9 and 10) having peripheral radial recesses into which the rollers are dropped one by one from a suitable feeding apparatus forming no part of the present invention. The roller holder is driven so as to rotate and carry the rollers in an arcuate path past the periphery of a suitably curved grinding wheel which imparts the curved surface to the end thereof.

As the rollers are carried in this arcuate path, they are driven by a driving wheel having an annular lateral peripheral surface, the rotary holder and driving wheel being preferably interconnected by gearing whereby the driving wheel is rotated at a much more rapid rate than the holder. The rollers, while in the roller holder, are engaged by a pressure wheel which urges them into engagement with the driving wheel on the opposite side thereof and insures a driving connection to the rollers.

The driving wheel and pressure wheel are provided with suitably tapered lateral peripheral surfaces corresponding to the taper of the rollers, and their cooperative action causes the rollers to be forced outwardly from the time the roller is dropped into the recess from the feeding apparatus until they engage an arcuate upper guide immediately prior to their reaching the grinding wheel. The more rapid rotation of the driving wheel relatively to the rotary holder also causes the rollers to be held against the leading edge of the roller recess (Figure 10) while this action is occurring. The axis of the pressure wheel is tilted slightly relatively to the common axis of rotation of the rotary holder and driving wheel, so as to more forcibly urge the rollers to travel radially outward in their recesses as they progress from the feeding station to the grinding station, and at the same time to provide a sufficiently large gap between the pressure wheel and driving wheel to receive the rollers from the feeding apparatus.

As the rollers leave the grinding station after their ends are rounded by the grinding wheel, they engage a lower arcuate guide, which holds them in the holder recesses until they reach the discharging station, where they drop out of the recesses and pass downward into a suitable receptacle.

Throughout the several views, the various shafts are shown as journalled in plain bearings, for clearness and simplicity of showing. In the machine as actually built, anti-friction bearings are preferably used because of their greater accuracy and long life.

Grinding unit

Referring to the drawings in detail, Figures 1 and 2 show a preferred embodiment of the grinding machine of this invention, generally consisting of a bed 10 upon which is mounted a roller feeding unit 11 (the lower portion only of which is shown), a roller holding and driving unit 12, a grinding unit 13 and a grinding wheel truing unit 14. The bed 10 is mounted upon any suitable sub-structure (not shown and forming no part of the present invention).

The grinding unit 13 is mounted upon and carried by a carriage or slide 15 reciprocably supported on ribs 16 (Figure 5) rising from the bed 10 and provided with longitudinal T-slots 17 which receive the heads and shanks of clamping bolts 18, the shanks of which pass through bores 19 in the carriage 15. The upper ends of the clamping bolts 18 are threaded to receive the clamping nuts 20 having handles 21 for tightening or loosening the same. The edge of the base 10 is provided with a peripheral lip 22 to which is secured an upstanding bracket 23 (Figures 1 and 2) as by the screws 24. The bracket 23 is provided with a bore 25 in which is journaled the reduced diameter end of a screw shaft 26 having a hand wheel 27 secured thereto as at 28, a spacing member 29 being interposed between the hand wheel 27 and the bracket 23.

The screw shaft 26 is threaded as at 30 to engage a nut 31 bolted as at 32 to the underside of the carriage 15 (Figures 2 and 5). By this means, when the clamping nuts 20 are loosened by turning the handles 21, the rotation of the hand wheel 27 causes the carriage 15 to be reciprocated to and fro along the T-slots 17, the ribs 16 having upper guide surfaces 33 (Figure 5) cooperating with the corresponding machined guide surfaces 34 on the underside 35 of the carriage 15. This action moves the grinding unit 13 toward and away from the roller holding and driving unit 12 (Figure 2). When the carriage 15 has been suitably positioned in this manner, the clamping nuts 20 are tightened by turning the handles 21, locking the carriage 15 and grinding unit 13 in their adjusted positions.

Rising from and forming a part of the carriage 15 is a box-like housing 36 having an aperture 37 (Figure 2) through which the truing unit 14 operates. The housing 36 has a top wall 38 from which rises a hollow cylindrical boss 39 having an internal bore 40 (Figure 2). Bolted to the upper and lower ends of the boss 39, as at 41 and 42, are end plates 43 and 44 having central bores 45 and 46 respectively. Journaled in the bores 45 and 46 is a shaft 47, here shown for purposes of simplicity, as provided with plain bearings. In the actual machine, however, anti-friction bearings, such as tapered roller bearings and suitable anti-thrust bearings are provided for rotatably supporting the shaft 47 in the end plates 43 and 44. The lower end of the shaft 47 is provided with a taper 48 adapted to receive the internally tapered hub 49 (Figure 2) of a grinding wheel holder 50 having a stepped annular recess 51 in the periphery thereof for receiving the correspondingly stepped portion 52 adjacent the bore 53 in a grinding wheel 54. The latter is provided with a suitably curved peripheral surface 55, the curvature thereof being initially determined and afterward maintained by the truing unit 14.

The grinding wheel 54 is held in the hub recess 51 by an annular face plate 56 having a stepped annular recess 57 similar to the opposing annular recess 51, the face plate 56 being bolted to the hub 49 by the screws 58 (Figure 2). A nut 59 is threaded upon the reduced diameter threaded portion 60 and holds the hub 49 upon the taper 48 upon the lower end of the shaft 47.

Mounted upon the upper end of the shaft 47 is a pulley 61 carrying an endless belt 62 which encircles a pulley 63 mounted upon the motor shaft 64 of a vertical motor 65. The motor 65 is provided with a base plate 66 (Figure 1) which is bolted as at 67 to a swinging plate 68. The latter is provided at one end with ears 69 engaging pivot pins 70 mounted in arms 71 projecting horizontally from the boss 39. The opposite end of the swinging plate 68 is provided with a yoke portion 72 through which is threaded a pivot bolt 73 pivotally engaged by the eye of an adjusting bolt 74 (Figure 2), the outer threaded end 75 of which passes through an arm 76 projecting radially from the boss 39 (Figure 1). Lock nuts 77 threaded upon the threaded end 75 of the bolt 74 serve to hold the latter in a locked position relatively to the arm 76. When one of the nuts 77 is loosened and the other is rotated, the bolt 74 is moved inward or outward relatively to the arm 76, thereby tightening or loosening the endless belt 62. In this manner, the motor 65 which is energized from a suitable electric power line (not shown), drives the grinding wheel 54 and causes its curved periphery 55 to rotate at the desired peripheral speed suitable for the grinding operation to be performed upon the ends of the rollers.

Grinding wheel truing unit

The grinding wheel truing unit 14 is mounted upon the guide ribs 80 integral with the carriage 15 and rising from the upper surface 81 thereof (Figure 5). Bolted as at 82 to the upper surfaces 83 of the guide ribs 80 are the bevelled elongated guide members 84 engaging a dove-tail slide 85, the lower surface 86 of which is machined accurately to reciprocate to and fro upon the upper machined surface 83 of the guide ribs 80. The slide 85 is provided with upstanding arms 87 bored transversely as at 88 (Figure 5) to receive a pivot pin 89. Pivotally mounted upon the pivot pin 89 is a rocking head 90 bored transversely as at 91 to receive the pivot pin 89. The head 90 is provided with a handle 92 by which it may be rocked around the pivot pin 89.

The head 90 is provided with a longitudinal bore 93 which receives a shaft 94. The latter is provided with a longitudinal keyway 95 engaged by a set screw 96 threaded through the bore 97 in the head 90 for preventing rotation of the shaft 94 in the head 90. The set screw 96 also serves to lock the shaft 94 in any desired position. The outer end 98 of the shaft 94 is provided with an inclined bore 99 serving as a socket for receiving the shank of a truing tool 100 (Figure 2), the latter being held in position by a set screw 101. By loosening the set screw 96 and moving the shaft 94 in or out, the tip of the truing tool 100, which is preferably diamond-tipped, may be set at the desired radius relatively to the axis of the pivot pin 89, corresponding to the curvature to be cut upon the peripheral surface 55 of the grinding wheel 54. This radius may be accurately set in any conventional manner, such as by suitable gauges (not shown) known to those skilled in the grinding art.

Bolted as at 102 to the recess 103 in the underside 86 of the dove-tail slide 85 is a nut 104 which receives the threaded end 105 (Figure 2) of the screw shaft 106, the latter being journaled in the bore 107 of the bridge portion 108 (Figure 1). A hand wheel 109 is mounted upon the reduced diameter portion 110 of the screw shaft 106. By rotating the hand wheel 109, the dove-tail slide 85 may be moved to and fro along its guide members 84, thereby moving the head 90 and consequently the truing wheel 100 into or out of engagement with the peripheral grinding surface 55 of the grinding wheel 54.

Roller feeding unit

The roller feeding unit 11 forms no part of the invention, and any suitable feeding unit may be used for feeding the rollers to the roller holding and driving unit 12. One such feeding unit suitable for this purpose is shown in the co-pending application of Charles L. Hommel, Serial No. 597,389, filed June 4, 1945. By this feeding unit, the rollers 111 (Figure 13) are fed from a hopper hap-hazardly, either the small end or the large end down, through a suitable selecting mechanism which engages the rollers 111 and drops them, small end downward, into a delivery tube 112, the lower end of which is supported by a bracket 113 bolted as at 114 (Figures 2 and 10) to an arm 115 which is bolted as at 116 to the roller holding and driving unit 12. The arm 115 is preferably of angle cross-section (Figure 1) and is provided with a flange 117 with spaced holes 118 for receiving the bolts 114 at the proper location.

Roller holding and driving unit

Rising from the bed 10 (Figure 3) are upstanding side walls 120 and 121 supporting platforms 122 and 123 respectively, the latter being slightly higher than the former. The top surface 124 of the platform 123 has secured thereon as at 124a a base member 125 having a bottom surface 126. The platform 123 and base member 125 are provided with aligned vertical bores 127 and 128 serving to receive a pivot pin 129 around which the base plate 125 swivels. The platform 123 is provided with an additional vertical bore 130 carrying a stop pin 131 (Figure 4). The base member 125 is provided with a central cavity 132 considerably larger than the stop pin 131 which is located therein so as to provide a sufficient lateral movement of the base plate 125.

Opening into the cavity 132 on opposite sides of the stop pin 131 are horizontal aligned bores 133 adapted to receive the reduced diameter extensions 134 of adjusting screws 135, the heads of which are threaded into the threaded enlargements 136 at the outer ends of the bores 133. As a consequence of this construction, the adjusting screws 135 may be turned to precisely swivel the base plate 125 around the pivot pin 129 for altering the alignment of a certain shaft mounted thereon as will be described below.

The base plate 125 is provided with upstanding dove-tail ribs 137 which are engaged by the dove-tail groove 138 in the base portion 139 of a slide 140. The ribs 137 are joined at the outer ends by a bridge portion 141 (Figure 3) having a horizontal bore 142 opening into a cavity 143 between the ribs 137. Journaled in the bore 142 is the reduced diameter portion 144 of a screw-shaft 145, having a hand wheel 146 mounted thereon, as at 147. The inner end of the screw shaft 145 is threaded as at 148 and engages a nut 149 having an upwardly extending stem 150 secured in the socket 151 as by the screw 152, the socket 151 being formed in the bottom of the slide 140.

The slide 140 is provided with an upstanding generally horizontal boss 153 having horizontally aligned bores 154 and 155 (Figure 3) opening into the central cavity 156. Journaled in the bores 154 and 155 is the pressure wheel shaft 157 having at its outer end a reduced diameter threaded portion 158 carrying a retaining nut 159 and washer 160. An end plate 161 secured as at 162 to the boss 153 covers the outer end of the shaft 157, together with the retaining nut 159, these being located in the outer end cavity 163 of the boss 153.

The boss 153 is also provided with an enlarged inner end cavity 164 (Figure 3) receiving the enlarged end 165 of the shaft 157. Secured as at 166 to the end 165 is the disc-like pressure wheel 167 having a thin resilient spring rim 168 secured as at 169 to the rim portion 170 thereof and having a tapered lateral annular surface 171 corresponding to the taper of the roller 111. As a consequence of this construction, the pressure wheel 167 may be moved in or out by rotating the hand wheel 146, or tilted in a lateral direction by adjusting the screws 135.

Mounted on the platform 122 of the bed 10 (Figure 3) is the base portion 172 of a housing 173 having a pair of aligned horizontal bores 174 and 175 opening into a cavity 176. Journaled in the bores 174 and 175 is the hollow shaft 177 which in turn is provided with co-axial aligned bores 178 and 179 opening into a cavity 180.

Journaled in the bores 178 and 179 is the roller holder shaft 181 having an enlarged portion 182 to which is secured the disc-like roller holder 183 as by the screw 184. The periphery of the roller holder 183 is provided with spaced recesses 185 (Figures 10 and 11) for receiving the rollers 111 and conveying them from the feeding device 11 to the grinding wheel 54 and thence to the discharging station. The hollow shaft 177 is likewise provided with an enlarged end 186 to which the driving wheel 187 is secured, as by the screws 188. The driving wheel 187 is provided with a lateral annular projecting portion 189 having a lateral tapered surface 190 corresponding to the taper of the roller 111 and with the tapered surface 171 of the pressure wheel 167 forming an outwardly flared annular space partially occupied by the roller holder 183.

The roller holder 183 and the driving wheel 187 are drivingly interconnected by gearing as described below, this gearing being driven by a motor 191 having a base plate 192 secured to a swinging plate 193 (Figures 1 and 2). The latter is provided with ears 194 engaging a pivot pin 195 carried by a bracket 196 bolted as at 197 to the top of the housing 173 (Figure 7). The opposite end of the swinging plate 193 is provided with an adjusting screw 198 threaded therethrough (Figure 2). The lower end of the adjusting screw 198 engages the housing 173 so that by turning the screw 198, the plate 193 may be swung around its pivot pin 195, thereby moving the motor 191 toward or away from the housing 173 for belt tightening purposes. The lock nut 199 serves to hold the adjusting screw 198 in its adjusted position.

The motor 191 (Figure 2) is provided with a shaft 200 carrying a pulley 201 driving an endless belt 202 which in turn drives a pulley 203 (Figures 1, 7 and 8) mounted upon a shaft 204. The shaft 204 is journaled in the aligned bores 205 and 206 in the interconnecting portion 207 (Figure 8) between the side walls 209 and 210 of the housing 173. (The view shown in Figure 8, is as previously stated, a developed view wherein the various shafts are laid out so as to lie substantially in one plane instead of their actual arrangement shown in Figure 7.) The inner end of the shaft 204 is held in place by the retaining nut 211 threaded upon the end thereof, the cavity in which it is located being closed by the cover plate 212.

Mounted upon and keyed to the shaft 204 is a hub 213 provided with pinions 214 and 215. The pinion 215 meshes with a gear 216 keyed to the hollow shaft 177 (Figures 3, 7 and 8), the gear 216 being held in place by a retaining nut 217 threaded upon the outer end of the hollow shaft 177. In this manner, the drive from the motor 191 is communicated to the driving wheel 187, which rotates at a much more rapid speed than the roller holder 183, which is connected thereto by reduction gearing as follows.

The pinion 214 drives a gear 218 which is mounted upon and keyed to the hub of the pinion 219, the pinion 219 being in turn loosely mounted upon the stub shaft 220, the latter being fixedly secured in the bore 211 in the housing wall 209 (Figure 8). The pinion 219 in turn drives the gear 222, the hub of which carries a pinion 223 driving a gear 224. The hub of the gear 222 and pinion 223 is loosely mounted upon the stub shaft 225 fixedly secured in the bore 226 in the housing wall 209. Similarly, the hub of the gear 224 is loosely mounted upon the stub shaft 227 fixedly secured in the bore 228 in the housing wall 209. Mounted upon and keyed to the hub of the gear 224 is a pinion 229 which meshes with a gear 230 mounted upon and keyed to the hub of a pinion 231. The latter is loosely mounted upon the stub shaft 232 fixedly secured in the bore 233 in the housing wall 209 and meshes with a gear 234 mounted upon and keyed to the roller holder shaft 181, it being held in place by a retaining nut 235 (Figure 3) threaded upon the outer end thereof. In this manner, the roller holder 183 is driven at a relatively slow speed compared with the driving wheel 187, the pressure wheel 167 not being driven, but freely rotatable in its bearings.

Mounted upon the upper part of the housing 173 and secured thereto as at 236 is a T-bracket 237, the cross bar of which has secured thereto, as at 238, the upper roller guide 239, slots 240 being provided for adjusting purposes (Figure 10). The roller guide 239 is provided with an arcuate guide surface 241 closely following the peripheral surface 242 of the roller holder 183 from the top of the latter downwardly to the grinding wheel 54. Beneath the grinding wheel 54 is mounted the lower roller guide 243 having a similar arcuate guide surface 244. The lower roller guide 243 is secured as at 245 to a slide 246 reciprocable in guideways 247 (Figure 2) and having a hollow cavity 248 terminating in a threaded bore 249. Threaded into the threaded bore 249 is the threaded end 250 of a screw shaft 251, the outer end of which is journaled as at 252 in the bracket 253 secured to and depending from the lip 22 of the bed 10. Secured to the outer end of the screw shaft 251 is a hand wheel 254. By turning the hand wheel 254 in one direction or the other, the screw shaft 251, by its engagement with the threaded bore 249, causes the slide 246 to reciprocate in the guideways 247 (Figure 2) moving the arcuate guide surface 244 of the lower roller guide 243 toward or away from the peripheral surface 242 of the roller holder 183.

Immediately below the lower end of the lower roller guide 243 is mounted a deflector plate 255 suspended from the bed 10 by the brackets 256. The deflector plate 255 serves to receive the impact of the ground rollers 111 as they drop from the recesses 185 in the roller holder 183 and deflect them into a suitable container (not shown).

*Operation*

A roller 111, before grinding by the present machine, is shown in Figure 13 with its large end comparatively flat. After grinding in the present machine, the roller 111 emerges with a curved surface 257 upon the end thereof, this being for the purpose of engaging the outer race of the tapered roller bearing unit in which the roller 111 is employed. Prior to operating the machine, the various adjustments previously described are made, such as the positioning of the upper and lower roller guides 239 and 243, the tilting of the shaft 157 of the pressure wheel 167, and the locating of the grinding wheel 54.

The unfinished rollers 111 are placed in the hopper (not shown) of the feeding unit 11 at the upper left-hand corners of Figures 2 and 10, the motors 191 and 65 are started in operation, and the coolant, such as water, is caused to flow upon the grinding wheel 54. When thus driven, the roller holder 183 is caused to rotate slowly, the driving wheel 187 to rotate rapidly and the grinding wheel 54 to rotate still more rapidly. The selector mechanism of the feeding unit 11, as previously stated, causes the rollers 111 to descend through the feeding tube 112 with their smaller ends downward, regardless of their positions in the hopper, and these rollers drop into the recess 185 in the roller holder 183 as the latter rotates slowly beneath the outlet of the tube 112.

The tilting of the pressure wheel shaft 157, as shown by the arrows in Figure 9, causes the space between the pressure wheel 167 at its rim portion 168 and the driving surface 190 of the driving wheel 187 to be wider than the width of the roller 111 at the side thereof diametrically opposite the grinding wheel 54, and this space is still amply wide to permit the roller 111 to drop therebetween into a recess 185 below the outlet of the feeding tube 112 (Figure 10). The rollers 111 drop one by one into the recesses 185 to which they are fed by the feeding unit 11 by proper timing. As the gap between the pressure wheel rim 168 and the driving wheel rim 189 closes up, due to the previously mentioned relative tilting of the shafts thereof, the side of the roller 111 is engaged by the rapidly rotating pressure wheel 187 toward which it is urged by the resilient rim 168 of the pressure wheel 167. This action not only rotates the roller 111 and causes it to be moved against the forward edge of the recess 185 but the squeezing action between the opposing surfaces 190 and 171 of the driving wheel 187 and the pressure wheel 167 moves the rollers 111 outwardly until they engage the arcuate guide surface 241 of the upper roller guide 239 (Figure 10). Meanwhile, the pressure wheel is rotated in the opposite direction to the driving wheel 187 through its frictional engagement with the opposite sides of the rollers 111 (Figure 11).

When the rollers 111, thus held and rotated while being guided by the upper guide 239 (Figure 12), reach the lower end of the upper roller guide 239, their ends engage the curved periphery 55 of the grinding wheel 54, which meanwhile is rotating rapidly upon an axis perpendicular to the axis of rotation of the driving wheel 187 and roller holder 183. As the ends of the rollers 111 are moved across the face of the grinding wheel 54 (Figure 6), they are ground to the curvature thereof and their large ends become curved as at 257 in Figure 14. When the rollers have been moved entirely across the grinding wheel 55, they immediately encounter the arcuate edge 244 of the lower roller guide 243 and continue in engagement therewith until the lower end thereof. At this point, the rollers 111 drop out of the recesses 185 and fall by gravity into engagement with the deflector plate 256 which guides them into a suitable container. It will be self-evident that the resilient pressure wheel rim 168 automatically takes care of variations in the diameter of the rolls 111 arising during manufacture, between the tolerance limits for a given size of roll. If the rim 168 were rigid and unyielding, oversized rolls would be thrust forward too far and their ends ground off too much, whereas undersized rolls would be permitted to be pushed backward too far and their ends thus ground off too little. The flexible rim 168 overcomes this and gives proper grinding of the ends of the rolls by yielding with oversized rolls and thrusting undersized rolls forward.

*Modified machine with both wheels positively driven*

The modification in Figures 15 to 18 inclusive is generally similar in principle to the foregoing form of the invention except that the driving wheel and pressure wheel are both positively driven and the roller holder is mounted for free rotation between them. The grinding unit 13 and the grinding wheel truing unit 14 in this modification remain substantially unchanged in construction from the corresponding units in the previously described form of the invention.

In particular, the bed 10 is provided with an auxiliary motor 260 (Figure 15) having its base plate 261 bolted to the underside thereof. The auxiliary motor 260 is provided with a motor shaft 262 carrying a pulley 263 which drives a V-belt 264. The latter in turn drives a pulley 265 mounted upon one end of a cross-shaft 266 supported in spaced bearing brackets 267 bolted to the opposite upper surfaces of the bed 10. Mounted upon one end of the shaft 266 near the pulley 265 and secured thereto as at 268 is a pinion 269 meshing with a gear 270 keyed to the pressure wheel shaft 271. The latter is rotatably mounted in the bearing bracket 272 bolted to the bed 10.

Keyed to the shaft 271 on the opposite sides of the bearing bracket 272 (Figure 16) is the hub 273 of the pressure wheel 274, the latter having an inwardly directed peripheral flange 275, the edge 276 of which is tapered outwardly for engagement with the tapered sides of the rollers 111. Beyond the hub 273 the shaft 271 is provided with an annular shoulder 277 and at its inner end is provided with a retaining washer 278 bolted thereto as at 279.

Mounted for free rotation upon the shaft 271 between the shoulder 277 and washer 278 is the hub 280 of the roller holder 281, the periphery of which is, as before, provided with spaced recesses 282 (Figures 15 and 18) for receiving the rollers 111 and conveying them from the feeding device 11 to the grinding wheel 54 and thence to the discharging station.

Mounted on the opposite end of the shaft 266 from the pulley 265 and secured thereto as at 283 is a pinion 284 of smaller pitch diameter and consequently with a lesser number of teeth than the pinion 269. The pinion 284 (Figure 17) meshes with an idler pinion 285 freely and rotatably mounted upon the stub shaft 286 mounted in the bearing bracket 267 and secured thereto as at 287.

The idler pinion 285 meshes with a gear 288 keyed to the outer end of a shaft 289 which is journaled in the bearing bracket 290 bolted to the bed 10 substantially opposite the bearing bracket 272. Keyed to the inner end of the shaft 289 is the hub 291 of the driving wheel 292, the periphery of which is provided with an inwardly directed flange 293 having an outwardly tapered edge 294 for engagement with the tapered sides of the rollers 111 diametrically opposite from their engagement by the tapered edge 276 of the pressure wheel 274.

Bolted as at 295 and 296 to the flat surfaces 297 and 298 of the bearing brackets 272 are radial angle brackets 299 and 300 (Figure 15) bent so that their outer ends 301 and 302 overhang the periphery of the roller holder 281. Connected as at 304 and 305 to the ends 301 and 302 and extending concentric with and spaced slightly away from the periphery 303 of the roller holder 281, the upper roller guide 306 extends downwardly to a point immediately adjacent the upper side of the grinding wheel 54. Bolted as at 308 to the bed 10 is a bracket 309 carrying a lower roller guide 310 having an arcuate guide surface 311 similar to the guide surface 307 of the upper roller bracket 306 and extending from a point immediately below the lower side of the grinding wheel 54 downwardly to the discharge station in a manner similar to that already described in connection with the principal form of the invention. The shafts 271 and 289 are also preferably tilted slightly relatively to one another in a horizontal plane as in the principal form of the invention for the same purpose and with the same result of urging the roller outwardly as it is carried in the roller holder 281.

In Figure 16, the shafts 271 and 289 and the hub 280 of the roller holder 281 have been shown, for purposes of simplicity and clarity, as journaled in plain or sleeve bearings. In the machine as actually built, however, tapered roller bearings were employed because of their greater precision and means for taking up the clearances thereof and thereby to provide and maintain predetermined precise clearances.

*Operation of the modified machine*

In the operation of the modification shown in Figures 15 to 18 inclusive, the gear ratios are such that the shaft 271 is rotated more rapidly than the shaft 289. As a consequence (Figure 18), when the auxiliary motor is energized and commences rotation, the pressure wheel 274 is driven in a clockwise direction (Figure 15) at a somewhat faster rate than the driving wheel 292 is driven in a counterclockwise direction. It will be evident, of course, that the terms "pressure wheel" and "driving wheel" are chosen merely to conform to the terminology employed in describing the principal form of the invention, whereas both wheels might equally well be termed driving wheels or pressure wheels since both are driven and both apply pressure to the rollers 111. The rollers are fed one at a time into the recesses 282 of the roller holder 281 from the feeding unit 11 (Figure 15) in the same manner as described above in connection with the principal form of the invention, and are engaged by the tapered edges 294 of the wheels 292 and 274. Since the wheel 274 is rotating clockwise more rapidly than the wheel 292 is rotating counterclockwise (Figures 15 and 18), the rollers 111 are not only urged against the forward walls of the recesses 282 but the differential motion between the wheels 274 and 292 imparts a resultant clockwise rotation to the roller holder 281, as the rollers 111 are rotated in a counterclockwise direction, viewed from above. In this manner, the rollers 111 are carried forward until their large ends 257 engage the guide surface 307 of the upper roller guide 306, at the same time being urged outwardly by the pressure exerted by the tapered surfaces 276 and 294 of the wheels 274 and 292, and by the effect of the slight tilt of the axes of the shafts 271 and 289 as described in connection with the operation of the principal form of the invention.

When the rollers 111 arrive opposite the grinding surface 55 of the grinding wheel 54, their ends 257 are ground to a curvature corresponding to the cross curvature thereof. As the rollers 111 emerge from engagement with the driving wheel 54, their ends 257 immediately engage the guide surface 311 of the lower roller guide 310 and remain in engagement therewith until they reach the lower end thereof, whereupon they drop out in a manner similar to that shown in Figure 10, and encounter the deflector plate 255 (Figure 9) and thence fall into a suitable container (not shown).

While I have shown and described my invention in detail, it is to be understood that the same is to be limited only by the appended claims, for many changes may be made without departing from the spirit and scope of my invention.

What I claim is:

1. A machine for end-grinding elongated articles comprising a rotary grinder, a rotary article holder thinner than said articles and having peripheral article holding recesses open laterally to expose the sides of said articles, said rotary article holder being positioned to move the ends of said articles across said grinder, means engageable with the exposed sides of said articles for rotating said articles around their longitudinal axes while being moved across said grinder, and means for urging said articles outwardly of said holder while so rotating them.

2. A machine for end-grinding elongated articles comprising a rotary grinder, a rotary article holder thinner than said articles and having peripheral article holding recesses open laterally to expose the sides of said articles, said rotary article holder being positioned to move the ends of said articles across said grinder, a rotary driving element mounted on one side of said article holder and engageable with the exposed sides of said articles for rotating said articles around their longitudinal axes while being moved across said grinder, a rotary pressure member mounted on the other side of said article holder and engaging the opposite sides of said articles for urging them into engagement with said driving element, a power source, and power-transmitting mechanism drivingly and rotatively connecting said rotary holder and said rotary driving element to said power source.

3. A machine for end-grinding elongated articles comprising a rotary grinder, a rotary article holder thinner than said articles and having peripheral article holding recesses open laterally to expose the sides of said articles, said rotary article holder being positioned to move the ends of said articles across said grinder, a rotary driving element mounted on one side of said article holder and engageable with the exposed sides of said articles for rotating said articles around their longitudinal axes while being moved across said grinder, a rotary resilient pressure member mounted on the other side of said article holder and engaging the opposite sides of said articles for urging them into engagement with said driving element, a power source, and power-transmitting mechanism drivingly and rotatively connecting said rotary holder and said rotary driving element to said power source.

4. A machine for end-grinding tapered rollers comprising a rotary grinder, a rotary roller holder positioned to move the ends of said rollers across said grinder and having peripheral recesses for receiving said rollers, said recesses being open laterally to expose the sides of said rollers, a rotary driving element mounted on one side of said roller holder and engageable with said exposed sides for rotating said rollers while being moved across said grinder, a rotary pressure member mounted on the other side of said article holder and urging said rollers into driven engagement with said driving element, said rotary grinder being mounted for rotation upon an axis transverse to the axes of rotation of said roller holder, said driving element and said pressure member, a power source and power-transmitting mechanism driving and rotatively connecting said rotary holder and said rotary driving element to said power source.

5. A machine for end-grinding tapered rollers comprising a rotary grinder, a rotary roller holder positioned to move the ends of said rollers across said grinder and having peripheral recesses for receiving said rollers, said recesses being open laterally to expose the sides of said rollers, a rotary driving element engageable with said exposed sides for rotating said rollers while being moved across said grinder, a power source, and power-transmitting mechanism drivingly and rotatively connecting said rotary holder and said rotary driving element to said power source, said mechanism being proportioned and arranged to rotate said driving element more rapidly than said holder whereby to urge said rollers against the forward edges of said recesses while being moved into engagement with said grinder.

6. A machine for end-grinding tapered rollers comprising a rotary grinder, a rotary roller holder positioned to move the ends of said rollers across said grinder and having peripheral recesses for receiving said rollers, said recesses being open laterally to expose the sides of said rollers, a rotary driving element mounted on one side of said roller holder and engageable with said exposed roller sides for rotating said rollers while being moved across said grinder, a rotary pressure member with a resilient roller-engaging rim mounted on the other side of said roller holder and engaging the opposite sides of said rollers for urging said rollers into engagement with said driving element, a power source, and power-transmitting mechanism drivingly and rotatively connecting said rotary holder and said rotary driving element to said power source.

7. A machine for end-grinding tapered rollers comprising a rotary grinder, a rotary roller holder positioned to move the ends of said rollers across said grinder and having peripheral recesses for receiving said rollers, said recesses being open laterally to expose the sides of said rollers, a rotary driving element engageable with said exposed sides for rotating said rollers while being moved across said grinder, and a rotary pressure member engaging the opposite sides of said rollers for urging said rollers into engagement with said driving element, said driving element and said pressure member having outwardly flared roller contacting surfaces whereby to urge said rollers outwardly of said recesses during the rotation of said holder.

8. A machine for end-grinding tapered rollers comprising a rotary grinder, a rotary roller holder positioned to move the ends of said rollers across said grinder and having peripheral recesses for receiving said rollers, said recesses being open laterally to expose the sides of said rollers, a rotary driving element engageable with said exposed sides for rotating said rollers while being moved across said grinder, a rotary pressure member engaging the opposite sides of said rollers for urging said rollers into engagement with said driving element, and means for tilting the axis of rotation of said pressure member relatively to the axis of rotation of said holder whereby to provide a space wider than said rollers remote from said grinder for receiving said rollers and also to urge said rollers outwardly of said recesses during the rotation of said holder.

9. A machine for end-grinding tapered rollers comprising a rotary grinder, a rotary roller holder positioned to move the ends of said rollers across said grinder and having peripheral recesses for receiving said rollers, said recesses being open laterally to expose the sides of said rollers, a rotary driving element engageable with said exposed sides for rotating said rollers while being moved across said grinder, and a rotary pressure member engaging the opposite sides of said rollers for urging said rollers into engagement with said driving element, said driving element and said pressure member having outwardly flared roller contacting surfaces, and said pressure member having its axis of rotation tilted forwardly relatively to the axis of rotation of said holder whereby to provide a space wider than said rollers remote from said grinder for receiving said rollers and also to urge said rollers outwardly of said recesses during the rotation of said holder.

10. A machine for end-grinding tapered rollers comprising a rotary grinder, a rotary roller holding wheel positioned to move the ends of said rollers across said grinder and having peripheral recesses for receiving said rollers, said recesses being open laterally to expose the sides of said rollers, a rotary driving wheel engageable with said exposed sides for rotating said rollers while being moved across said grinder, and a rotary pressure wheel mounted on the opposite side of said roller holding wheel from said driving wheel and also engaging the exposed sides of said rollers, and mechanism for positively driving at least two of said wheels.

11. A machine for end grinding elongated articles comprising a rotary grinder, a rotary article holder positioned to move the ends of said articles across said grinder, rotary driving elements disposed on opposite sides of said article holder in driving engagement with the opposite sides of said articles, and means for driving said driving elements in opposite directions at different peripheral speeds whereby to impart a resultant rotation to said rotary article holder.

12. A machine for end grinding elongated articles comprising a rotary grinder, a rotary article holder mounted for free rotation and positioned to move the ends of said articles across said grinder, rotary driving elements disposed on opposite sides of said article holder in driving engagement with the opposite sides of said articles, and means for driving said driving elements in opposite directions at different peripheral speeds whereby to impart a resultant rotation to said rotary article holder.

13. A machine for end grinding elongated articles comprising a rotary grinder, a rotary article holder mounted for free rotation and positioned to move the ends of said articles across said grinder, rotary driving elements disposed on opposite sides of said article holder in driving engagement with the opposite sides of said articles, and means for driving said driving elements in opposite directions at different peripheral speeds whereby to impart a resultant rotation to said rotary article holder, said article holder having spaced peripheral recesses therein for receiving and holding said articles.

14. A machine for end grinding elongated articles comprising a rotary grinder, a rotary article holder mounted for free rotation and positioned to move the ends of said articles across said grinder, rotary driving elements disposed on opposite sides of said article holder in driving engagement with the opposite sides of said articles, and means for driving said driving elements in opposite directions at different peripheral speeds whereby to impart a resultant rotation to said rotary article holder, said article holder having spaced peripheral recesses open at the opposite sides thereof to expose the sides of said articles to engagement by said rotary driving elements.

15. A machine for end grinding elongated articles comprising a rotary grinder, a rotary article holder mounted for free rotation and positioned to move the ends of said articles across said grinder, rotary driving elements disposed on opposite sides of said article holder in driving engagement with the opposite sides of said articles, and means for driving said driving elements in opposite directions at different peripheral speeds whereby to impart a resultant rotation to said rotary article holder, said article holder having spaced peripheral recesses therein for receiving and holding said articles, said rotary driving elements having oppositely and outwardly flared article contacting surfaces whereby to urge said rollers outwardly of said recesses during the rotation of said article holder.

GLEN F. JOHNSON.

REFERENCES CITED

The following references are of record in the file of this patent:

UNITED STATES PATENTS

| Number | Name | Date |
|---|---|---|
| 891,992 | Hess | June 30, 1908 |
| 1,128,091 | Barnes | Feb. 9, 1915 |
| 1,298,486 | Fjellman | Mar. 25, 1919 |
| 2,024,118 | Vanderbeek | Dec. 10, 1935 |
| 2,109,600 | Vanderbeek | Mar. 1, 1938 |
| 2,211,350 | Osborn | Aug. 13, 1940 |
| 2,341,825 | Spicacci | Feb. 15, 1944 |

FOREIGN PATENTS

| Number | Country | Date |
|---|---|---|
| 618,962 | Germany | Sept. 19, 1935 |